United States Patent

[11] 3,622,300

| [72] | Inventor | Gustave Javaux<br>Brussels, Belgium |
|---|---|---|
| [21] | Appl. No. | 730,285 |
| [22] | Filed | May 20, 1968 |
| [45] | Patented | Nov. 23, 1971 |
| [73] | Assignee | Glaverbel, S.A.<br>Watermael, Boitsfort, Belgium |
| [32] | Priority | May 25, 1967 |
| [33] | | Belgium |
| [31] | | P 540 |

[54] FLOAT GLASS APPARATUS WITH LATERAL GUIDES
10 Claims, 6 Drawing Figs.

[52] U.S. Cl. .................................................... 65/182 R,
65/91, 65/99 A, 65/356
[51] Int. Cl. .................................................... C03b 18/02
[50] Field of Search .......................................... 65/182, 99
A, 65 A, 91, 356

[56] References Cited
UNITED STATES PATENTS

| 3,266,880 | 8/1966 | Pilkington | 65/99 A |
|---|---|---|---|
| 3,353,943 | 11/1967 | Loutte | 65/99 A |
| 3,433,612 | 3/1969 | Dickinson | 65/99 A |
| 3,468,653 | 9/1969 | Robinson | 65/99 A |

*Primary Examiner*—S. Leon Bashore
*Assistant Examiner*—J. B. Hardaway
*Attorney*—Spencer & Kaye ABSTRACT: An arrangement for controlling the edges of a float glass ribbon in apparatus in which the ribbon floats along a molten bath between two longitudinal walls and in which rotary discs are provided along the edges of the ribbon for rotation about their axes in a plane parallel to the lateral edges of the ribbon, the edges of the ribbon being controlled by the provision of guide pieces disposed between the rotary discs and the longitudinal walls for preventing laterally drifting glass from coming in contact with the longitudinal walls and for urging this glass back toward the main portion of the ribbon, the guide pieces being arranged so that the glass will not adhere thereto.

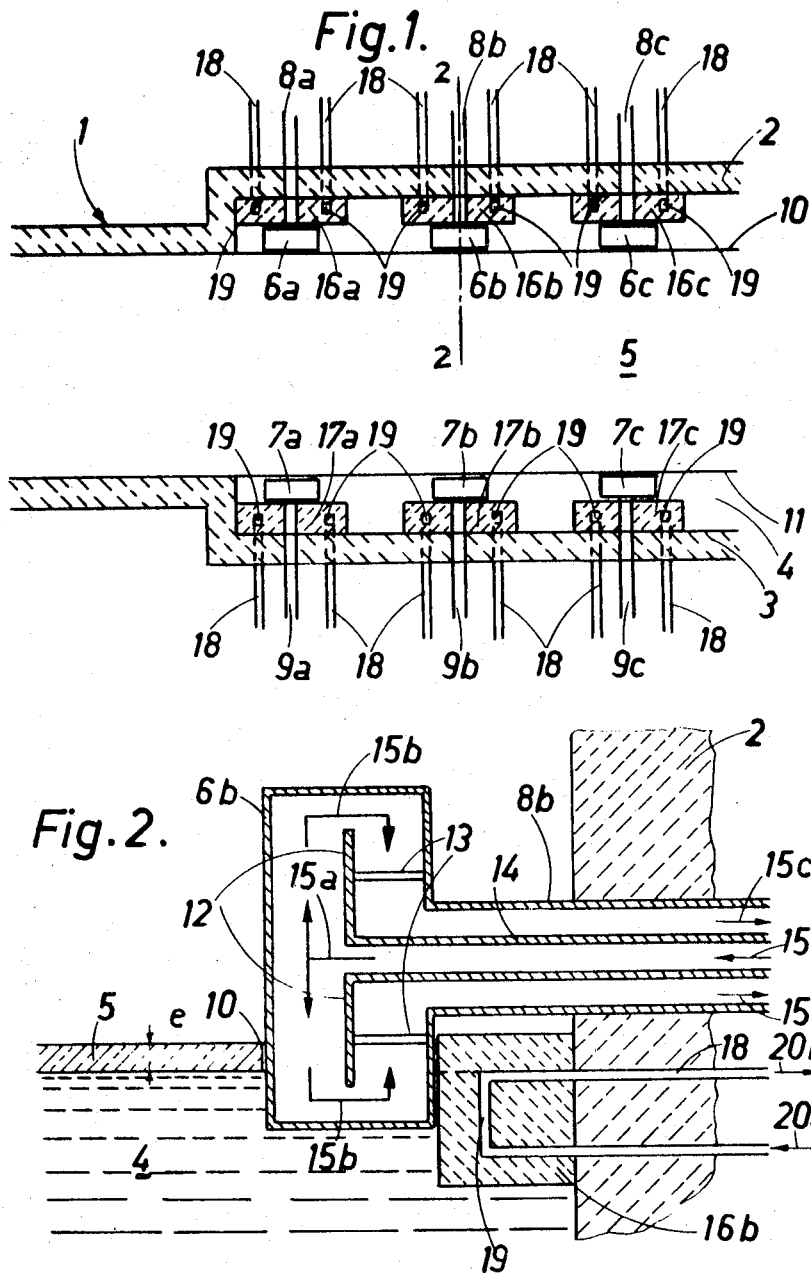

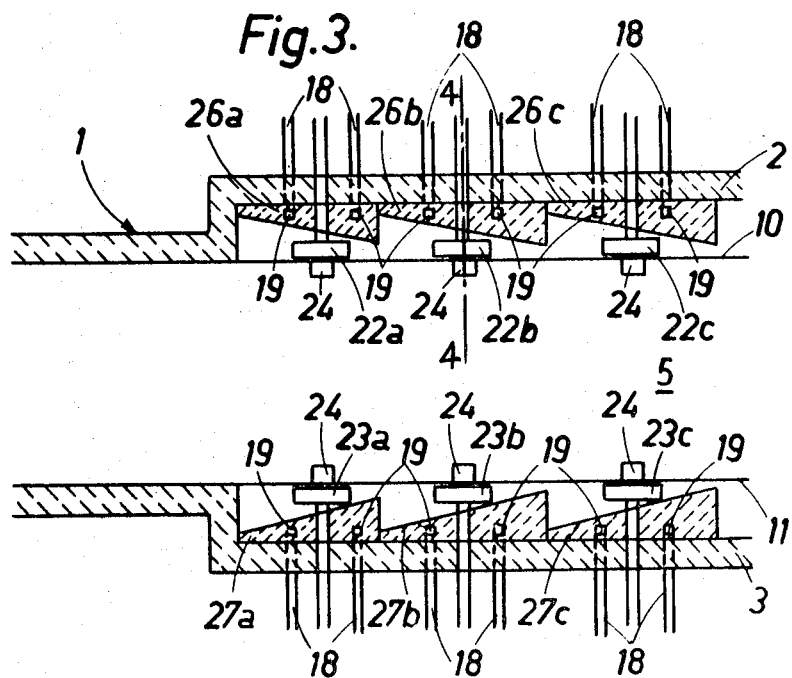
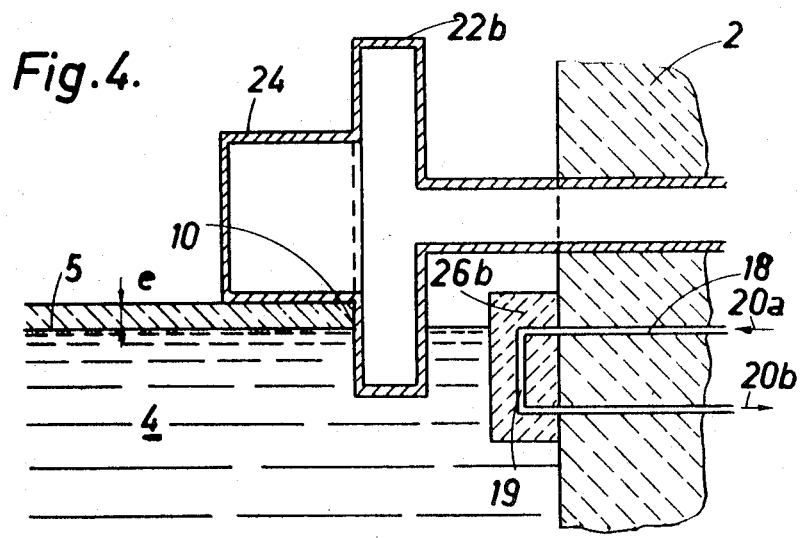

INVENTOR
Gustave Javaux

BY Spencer & Kaye
ATTORNEYS

FLOAT GLASS APPARATUS WITH LATERAL GUIDES

BACKGROUND OF THE INVENTION

The present invention relates to apparatus for use in the manufacture of flat, or sheet, glass, and particularly to improvements in the apparatus disclosed and claimed in the U.S. Pat. No. 3,353,943 issued to Jean Loutte on Nov. 21st, 1967 on an application filed on Sept. 9th 1963.

The above-cited patent discloses apparatus for use in the manufacture of flat glass by a float-type process in which molten glass is allowed to spread out on the surface of a bath of molten metal or salt.

If the lateral spread of molten glass on such a bath were unrestricted, the glass layer would reach an equilibrium thickness which is determined by the surface tension effects experienced by the glass. The apparatus which is the subject of the Loutte patent can be used with advantage in the production of float glass whose thickness is equal to or less than its equilibrium thickness, the apparatus also permitting the production of float glass at a predetermined thickness greater than the equilibrium thickness. This result is achieved by the provision of rotatable discs which are located alongside the path of the float glass for limiting the width of the floating glass layer.

Thus, the apparatus constituting the invention disclosed in the Loutte patent includes a compartment in which a glass ribbon is caused to move on a bath of molten material which is denser than the latter, and is characterized in that it further includes, in the neighborhood of each of the longitudinal walls of the compartment, at least one substantially vertical disc which is partially immersed in the bath of molten material and which is capable of rotating about its axis in a plane parallel to the lateral edge of the glass ribbon.

It has been found that when apparatus as described in the Loutte patent is used, there is a possibility, if the glass has a very high fluidity, i.e., a low viscosity, that the molten glass will spread laterally outwardly beyond the boundary planes defined by the inner faces of the discs. This may occur, for example, if the cooling of the glass ribbon at one or each of its lateral margins is not subjected to a precise control. There is then a risk that this laterally spreading glass will actually move into contact with the hot longitudinal walls of the compartment and adhere to them. For example, the glass may pass under the discs and be dragged against the longitudinal walls beneath the surface of the bath. If the glass should contact the longitudinal walls at those or other locations and adhere to the walls, the equilibrium of the glass ribbon will be disturbed and the ribbon will break up.

SUMMARY OF THE INVENTION

It is a primary object of the present invention to eliminate these drawbacks and difficulties. Another object of the invention is to protect the glass ribbon from contacting the longitudinal walls in such apparatus.

Still another object of the invention is to urge any glass which drifts laterally from the edges of the ribbon back towards the main portion of the ribbon.

These and other objects according to the invention are achieved by the provision, in an apparatus for the manufacture of sheet glass which includes a compartment in which a glass ribbon is caused to float upon and advance along a bath of molten material which is denser than the glass, the apparatus also including in the vicinity of each of the longitudinal walls of the compartment, at least one substantially vertical disc a part of which is immersed in the bath of molten material and which is arranged to rotate about its axis adjacent, and in a plane parallel to, one lateral edge of the glass ribbon, the improvement which includes, in the vicinity of each of the longitudinal walls, a stationary guide piece to which the molten glass is substantially nonadherent, each guide piece being situated in the space between one such wall and a respective rotary disc which is in the vicinity of the same wall and projecting beyond the periphery of the immersed part of the disc in at least one direction parallel to the plane of rotation of its associated disc.

The stationary guide pieces may be formed of a material which is inherently nonadherent to the molten glass and/or such pieces may be cooled, for example by a fluid coolant flowing therethrough. It is preferable to continuously cool the guide pieces so that they will quickly cool any molten glass which drifts into contact with them. The guide pieces could very suitably be made of carbon.

BRIEF DESCRIPTION OF THE DRAWINGS

FIG. 1 is a cross-sectional plan view of apparatus incorporating one embodiment of the present invention.

FIG. 2 is a cross-sectional, elevational view along the line 2—2 of FIG. 1.

FIG. 3 is a view similar to that of FIG. 1 showing another embodiment of the present invention.

FIG. 4 is a view similar to that of FIG. 2 taken along the line of 4—4 of FIG. 3.

DESCRIPTION OF THE PREFERRED EMBODIMENTS

Figure 5:
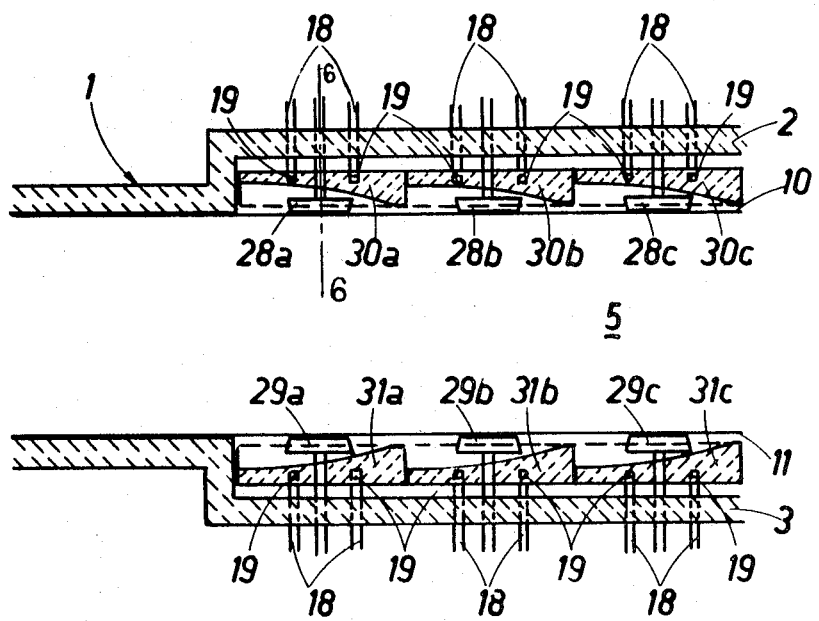
FIG. 5 is a view similar to that of FIG. 1 of still another embodiment of the present invention.

The embodiment shown in FIGS. 1 and 2 is composed of a compartment having longitudinal walls 2 and 3 and containing a bath 4 of a molten material on which floats an advancing ribbon 5 of glass in a softened, or plastic, state. The ribbon has a thickness $e$. Metal discs $6a$, $6b$ and $6c$, and $7a$, $7b$ and $7c$, keyed to shafts $8a$, $8b$ and $8c$, and $9a$, $9b$ and $9c$, respectively, which drive the discs in rotation, are disposed alongside the edges 10 and 11, respectively, of the ribbon 5.

The series of discs 6 and 7 and the series of shafts 8 and 9 are hollow and are cooled by water circulation as shown in FIG. 2. To this end, an annular baffle plate 12 is attached by means of struts 13 to the inside of each of the discs. The plate 12 is integral with a tube 14 coaxial with the shaft 8 or 9. Cooling water is fed into the disc through the tube 14, and exits between the tube 14 and the shaft 8 or 9 after having circulated within the disc by flowing around the baffle plate 12. The circulation of the coolant is indicated by the arrows 15, $15a$, $15b$ and $15c$ in FIG. 2.

The purpose of cooling the discs is to prevent the glass at the edges of ribbon 5 from sticking to them and to accelerate the solidification of the edges of the glass ribbon, thus improving their rigidity. The discs could, as an alternative, be made of a material to which the softened glass could not adhere even if such material were not cooled, boron nitride being one such material.

To prevent any glass which might drift laterally, as a result of an abnormal decrease in the viscosity of a marginal portion of the glass ribbon 5, from adhering to the adjacent longitudinal wall, auxiliary guide pieces $16a$, $16b$ and $16c$, and $17a$, $17b$ and $17c$ are provided according to the invention. Each guide piece extends between a respective disc $6a$, $6b$, $6c$, $7a$, $7b$ or $7c$ and the corresponding longitudinal wall 2 or 3.

The auxiliary guide pieces are preferably made of carbon and in this embodiment have the form of parallelepipeds, preferably of the rectangular kind. They extend laterally across substantially the entire space between each disc and its adjacent longitudinal wall, and the length of each guide piece, measured in the longitudinal direction of the compartment, is about twice the diameter of each disc.

As appears from FIG. 2, the guide pieces extend into the bath to a depth slightly greater than the maximum depth of immersion of the discs. The spacing between successive guide pieces can be greater or less than that shown, depending on the extend to which the glass is liable to drift in the particular process involved.

Each carbon guide piece is held in position by means of a hollow locating rod 18 which extends through the longitudinal wall 2 or 3 to join, and form an extension of a passage 19 formed within the guide piece, and coolant is circulated through each guide piece as indicated by the arrows 20a and 20b in FIG. 2.

If glass at the margin 10 of the ribbon 5 begins to spread out laterally between, for example, the discs 6a and 6b, this glass, which then has both a lateral and a forward component of motion, will encounter the inside face of the guide piece 16b on the upstream side of disc 6b. Upon contacting this auxiliary guide piece 16b, the glass is subjected to a first cooling. The glass will not stick to the guide piece but will be drawn along the guide piece by the forward movement of the glass ribbon and will continue to be cooled. On reaching the disc 6b, the drifted glass, which has by this time become less fluid, becomes pushed down into the bath by the disc, the cooling of the glass thereby being accelerated. Due to the action of the disc, this glass is drawn forward more rapidly than the glass in the main part of the ribbon and when the drifted glass reemerges to the surface of bath 4 downstream of the disc, such glass is progressively returned to the normal path of the glass ribbon.

FIGS. 3 and 4 show an embodiment of the present invention which differs from the apparatus illustrated in FIG. 1 in the configuration of the metal discs and guide pieces. In FIGS. 2 and 3, metal discs 22a, 22b and 22c, and 23a, 23b and 23c are disposed alongside the edges 10 and 11, respectively, of the glass ribbon 5. Each disc has an inwardly projecting central portion 24 which is of, smaller diameter than the rest of the disc and which contacts the top of the glass ribbon along one of its margins to help draw the ribbon along the bath 4 of molten material. The larger diameter portion of the disc dips into the bath and acts to limit the width of the ribbon 5. Central portion 24 of the disc, like the larger diameter outer portion, can be cooled by internally circulated coolant, the coolant flow means not being shown in FIG. 4.

The auxiliary guide pieces 26a, 26b, 26c, 27a, 27b and 27c are made of carbon and in this embodiment the guide pieces are in the form of prisms having trapezoidal upper and lower surfaces. The inside face of each guide piece is slanted toward ribbon 5 in the direction of its forward motion so as to urge drifted glass back toward the main portion of the ribbon.

The carbon guide pieces extend along the insides of the longitudinal walls of the compartment and shield these walls from being contacted by the molten glass. The guide pieces touch one another so as to protect the entire wall portion between each successive pair of discs. As in the embodiment of FIGS. 1 and 2, the guide pieces extend into the bath of molten material to a depth greater than the depth of immersion of the discs.

The guide pieces are held in position by means of hollow locating rods 18, which together with passages 19 in the guide pieces provide for circulation of coolant through the guide pieces, as indicated by arrows 20a and 20b, in the same way as in the apparatus shown by FIGS. 1 and 2. In comparison with the first-described embodiment, the embodiment of FIGS. 3 and 4 has the advantages that the longitudinal walls of the compartment are completely shielded by the guide pieces and that the return of any drifting glass to the normal ribbon path is aided by the shaping of the guide pieces with slanted inner faces.

Figure 6:
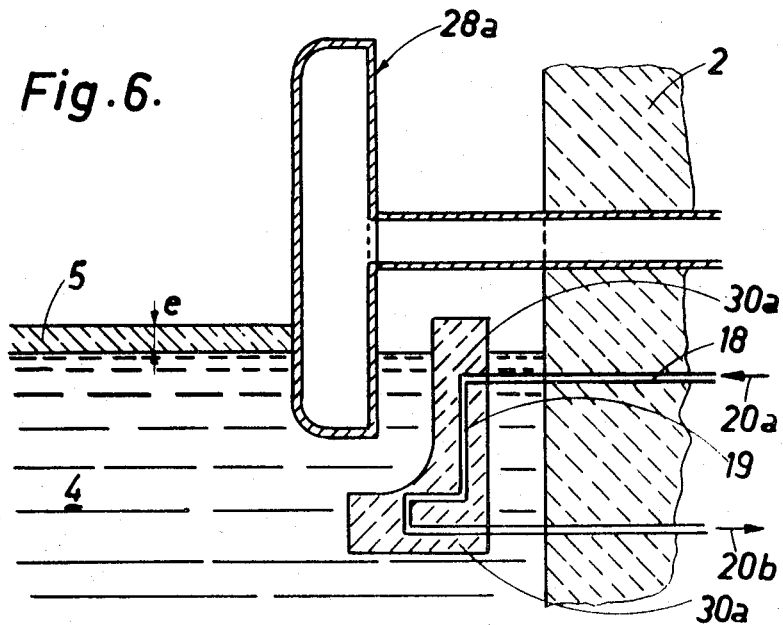
FIG. 6 is view similar to that of FIG. 2 taken along the line 6—6 of FIG. 5.

The embodiment of FIGS. 5 and 6 also differs from those previously described by the configuration of its discs and guide pieces. In the arrangement of FIGS. 5 and 6, the discs 28a, 28b, 28c, 29a, 29b and 29c, which are made of metal, have rounded edges bordering the inner faces of the discs. This prevents the discs from cutting into any glass which spreads laterally. The auxiliary guide pieces 30a, 30b, 30c, 31a, 31b, and 31c have an approximately L-shaped cross section in a vertical plane perpendicular to the length of ribbon 5, as is illustrated in FIG. 6. The vertical portion, or leg, of each L-shaped piece occupies only part of the lateral space between its associated disc and the adjacent longitudinal wall of the compartment. In addition, the inner face of each vertical leg is made convex and slopes toward ribbon 5 in the direction of ribbon movement, this inner face merging with the inner face of the horizontal leg of the guide piece at the downstream end thereof. The horizontal portion of each L-shaped piece extends partly beneath its associated disc. The successive guide pieces along each longitudinal wall are in contact with one another. The guide pieces are held in position, spaced from the longitudinal walls 2, 3, by hollow rods 18 which communicate with passages 19 in the guide pieces to permit circulation of a coolant through the guide pieces as indicated by arrows 20a and 20b.

In the apparatus of FIGS. 5 and 6, the guiding of drifting glass as it slides against an auxiliary guide piece, and during the return of the glass to the normal path of the glass ribbon by the action of the next disc downstream, is found to be even better than in the apparatus of FIGS. 3 and 4.

It may thus be seen that the guide pieces of the present invention may extend across substantially all of, or only a part of, the lateral space between a respective disc and its associated longitudinal wall.

The guide pieces, or at least the faces thereof which are nearest the discs, preferably extend into the bath to a lower level than the discs. Alternatively, or additionally, the guide pieces may project beyond the peripheries of the discs in the longitudinal direction of the compartment. Preferably, the guide pieces project beyond the peripheries of the discs, at least in the upstream direction of the compartment.

In certain preferred embodiments, there are successive rotatable discs in the vicinity of each of the longitudinal walls of the compartment, and one or more stationary guide pieces are located against, or near to, each of the walls at locations appropriate for intercepting molten glass in the event it should spread laterally, in the region between successive discs, towards such wall.

If molten glass at a margin of the glass ribbon drifts into contact with a guide piece at a point where it projects upstream beyond a disc, and is thereby cooled, this laterally displaced glass, which is drawn along by the glass forming the main part of the ribbon, becomes pushed down into the bath when it encounters the next disc, thus becoming further cooled, and upon regaining the surface of the bath such marginal glass becomes gradually returned to the correct path of the ribbon by the then following disc.

The guide pieces can extend over the whole of the distances between successive discs. For example, the whole of the longitudinal walls can be shielded from contact by the glass by one or more guide pieces if so desired. The guide pieces can, however, be disposed so as to be effective to prevent laterally spreading glass from contacting the longitudinal walls at locations between successive discs, even if the guide pieces do not extend over the whole of the distances between successive discs. This is because any glass which drifts laterally outwardly between successive discs has a forward component of motion so that it moves diagonally towards the longitudinal walls and is not likely to flow into contact with such walls at points immediately downstream of any given rotary disc.

In preferred embodiments, a guide piece extends between each disc and its neighboring longitudinal wall, and, viewed in elevation, such guide piece extends beyond the disc in both the upstream and downstream directions.

According to another preferred feature, the guide pieces are shaped to present sloping faces to the approaching glass so that in the event of glass moving outwardly into contact with the guide pieces, these sloping faces deflect the glass back towards the correct path.

It will be understood that the above description of the present invention is susceptible to various modifications, changes, and adaptations, and the same are intended to be comprehended within the meaning and range of equivalents of the appended claims.

I claim:

1. In apparatus for the manufacture of sheet glass, which apparatus includes a compartment in which a glass ribbon is caused to float upon and advance along a bath of molten material which is denser than the glass, the compartment having two longitudinal walls between which the ribbon advances in a longitudinal direction, the apparatus further including in the vicinity of each of the longitudinal walls of the compartment, at least one substantially vertical disc a part of which is immersed in the bath of molten material below the level of the glass ribbon and which is arranged to rotate about its axis adjacent, and in a plane parallel to, one lateral edge of the glass ribbon, the improvement comprising, in the vicinity of one of said walls, at least one stationary guide piece to which the molten glass is substantially nonadherent, said guide piece being disposed in the space between said one wall and a respective rotary disc which is in the vicinity of said one wall and projecting beyond the periphery of the immersed part of the disc in at least one direction parallel to the plane of rotation of its associated disc, and at least that face of said guide piece which is nearest its respective disc extends into the bath to a lower level than does said disc.

2. Apparatus as defined in claim 1 wherein said guide piece projects beyond the periphery of its respective disc in the longitudinal direction of said compartment.

3. Apparatus as defined in claim 2 wherein said guide piece projects beyond the periphery of its respective disc at least in the upstream direction of said compartment.

4. Apparatus as defined in claim 1 wherein there are successive rotatable discs in the vicinity of each of said longitudinal walls of said compartment and there are a plurality of guide pieces each associated with a respective disc, each said guide piece being disposed adjacent the inside surface of one said wall and projecting upstream of its associated disc by a sufficient distance to intercept any glass which may stray laterally from the ribbon when the ribbon has a given forward velocity.

5. Apparatus as defined in claim 4 wherein each said guide piece extends beyond its respective disc in both the upstream and downstream directions of said compartment.

6. Apparatus as defined in claim 1 wherein said guide piece is shaped to present a sloped inner face to the approaching glass for deflecting laterally spreading glass back towards the body of the ribbon.

7. Apparatus as defined in claim 1 wherein said guide piece is made of carbon.

8. Apparatus as defined in claim 1 further comprising means associated with said guide piece for circulating a coolant therethrough.

9. Apparatus as defined in claim 1 wherein said guide piece is in contact with said one longitudinal wall.

10. Apparatus as defined in claim 1 wherein said guide piece is spaced inwardly from said one longitudinal wall.

* * * * *